US011014710B2

(12) United States Patent
Skiba (10) Patent No.: US 11,014,710 B2
(45) Date of Patent: May 25, 2021

(54) PORTABLE ENVIRONMENTAL STORAGE CONTAINER SYSTEM

(71) Applicant: Burt Skiba, Mesa, AZ (US)

(72) Inventor: Burt Skiba, Mesa, AZ (US)

( * ) Notice: Subject to any disclaimer, the term of this patent is extended or adjusted under 35 U.S.C. 154(b) by 0 days.

(21) Appl. No.: 16/351,763

(22) Filed: Mar. 13, 2019

(65) Prior Publication Data

US 2019/0283935 A1    Sep. 19, 2019

Related U.S. Application Data

(60) Provisional application No. 62/642,399, filed on Mar. 13, 2018.

(51) Int. Cl.

| | |
|---|---|
| *B65D 25/02* | (2006.01) |
| *B65D 81/38* | (2006.01) |
| *B65D 55/02* | (2006.01) |
| *B65D 51/24* | (2006.01) |
| *A61J 1/14* | (2006.01) |
| *A61J 1/16* | (2006.01) |
| A61J 1/00 | (2006.01) |
| A24F 15/18 | (2006.01) |
| H04Q 9/00 | (2006.01) |

(52) U.S. Cl.
CPC ............ *B65D 25/02* (2013.01); *A61J 1/1437* (2013.01); *A61J 1/165* (2013.01); *B65D 51/24* (2013.01); *B65D 55/02* (2013.01); *B65D 81/3818* (2013.01); *A24F 15/18* (2013.01); *A61J 1/00* (2013.01); *A61J 2200/42* (2013.01); *A61J 2200/70* (2013.01); *A61J 2200/72* (2013.01); *H04Q 9/00* (2013.01); *H04Q 2209/40* (2013.01)

(58) Field of Classification Search
CPC .. A24F 15/18; A61J 1/00; A61J 1/1437; A61J 1/165; A61J 2200/42; A61J 2200/70; A61J 2200/72; B65D 25/02; B65D 51/24; B65D 55/02; B65D 81/3818; H04Q 2209/40; H04Q 2209/43; H04Q 9/00
See application file for complete search history.

(56) References Cited

U.S. PATENT DOCUMENTS

| | | | | |
|---|---|---|---|---|
| 4,974,423 | A  * | 12/1990 | Pring | F25D 3/14 435/307.1 |
| 2010/0282762 | A1* | 11/2010 | Leonard | B65D 81/3841 220/592.01 |
| 2015/0197390 | A1* | 7/2015 | Kurabe | B65D 81/3841 220/592.27 |
| 2016/0355318 | A1* | 12/2016 | Epenetos | B65D 81/24 |

* cited by examiner

*Primary Examiner* — Sisay Yacob (57) ABSTRACT

The present application provides a unique way for storing cigars, and medicines in a portable environmental storage container system. The portable environmental storage container system can comprise a lid, an inner compartment, an outer container, electronics, and a bottom enclosure. An inner compartment can slide in and out of an outer container and seal shut with a seal keeping the inside of the container air tight with the humidity kept in when sealed, or the humidity out if none is desired. After the contents have been stored within the portable environmental storage container the user can monitor the contents inside the container with a portable computing device in real time.

12 Claims, 13 Drawing Sheets

PORTABLE ENVIRONMENTAL STORAGE CONTAINER SYSTEM

CROSS REFERENCE TO RELATED APPLICATIONS

The present application claims the benefit under 35 U.S.C. 119 of U.S. Provisional Patent Application Ser. No. 62/642,399 filed Mar. 13, 2018. The U.S. Provisional Patent Application Ser. No. 62/642,399 is hereby incorporated by reference in its entirety.

TECHNICAL FIELD

The present invention relates to portable environmental storage, preservation, and transport container usable by individuals that have a need to store and monitor items at a set temperature, humidity, pressure, and environment. More particularly, an environmental storage container that can be connected to a user's smartphone allowing the user to monitor and keep the contents safe, secure, and fresh.

BACKGROUND

Various types of devices for safely storing medicine, storing cigars and transporting organs are known in the art. There are certain physical conditions or ailments, such as cancer, glaucoma, HIV, and Alzheimer that require regular application of medication. In addition, it may also be required that certain counteractive agents that may need to be available if an individual has an emergency, or needs to travel with their medication. For example, a person who is allergic to bees, must have quick access to medication in case of a sting. In addition, regular and repeated application of the medication may be required by the individual, but may be subject to rapid degradation, drying out as a result of temperature and improper humidity levels. Other items may be effected or sensitive to sun light. Many of these medications are kept in glass storage, humidors, plastic containers, or vials which are subject to breakage if dropped, and can easily spoil the contents if not properly monitored and maintained.

As a result, many people carry large coolers, humidors, or glass containers to carry their cigars, and medicine in, or they do not carry it at all. For example, a diabetic must always remain close to their insulin in order to receive regular injections should their blood sugar levels indicate, but their insulin must be stored at the right temperature in order to maintain its effectiveness. In addition, there have been a number of efforts in the prior art to provide portable medicine protector such as U.S. Pat. No. 4,738,364 where a portable medicine protector for maintaining the temperature of medicine stored therein from rising above a threshold temperature and for preventing the temperature of medicine stored from falling below a second threshold temperature. Typically, individuals carrying portable storage containers use ice or ice bags within the container, but have no way of checking what the temperature is set within that container. Another application for storage containers used in the art are for transporting donor organs. Typically, when hospitals transport donor organs from hospital to hospital they use a large thermos cooler, or foam cooler to keep the organs cold.

In addition, when storing cigars, medicine, medicinal *cannabis*, current portable humidors, or medicinal containers cannot be locked, and kept away from their kids or others. Furthermore, when individuals go to beaches or on hikes, or are on the go they need a safe way to store items away from others. Therefore, it would be advantageous to provide an individual with a portable storage container that can keep items at a set temperature, humidity level and a controlled environment that can be locked to keep unwanted individuals out.

SUMMARY

Aspects disclosed herein relates to a portable environmental storage container. A portable environmental storage container system can comprise a lid, an inner compartment, an outer container, and a pcb enclosure. An inner compartment can comprise of an inner section having an inner diameter and an outer diameter with the outer diameter being able to slide in and out of an outer container and seal shut with one or more seal on the bottom of the lid. A lid can be circular having a large section and small section having a hollow center with both sections having an inner diameter and outer diameter. A lid's smaller section can have one or more grooves on its outer diameter that can house one or more seals. The lid can be attached to an inner compartment. An inner compartment can further comprise a locking plate that can be attached to the bottom of the inner compartment.

The inner compartment can slide or move in and out of an outer container. The inner compartment can have one or more grooves or guides that can extend vertically from about the inner compartment's bottom surface to about its top surface. An outer container can have an outer wall, and inner wall having an air gap between each wall. The bottom enclosure can comprise an enclosure, a bottom plate, a fastener enclosure, a lock, and a bottom seal. The bottom plate can attach to the enclosure by two or more fasteners. The fastener enclosure can be removably attached to the bottom plate and the enclosure, and the lock can be placed on the bottom plate, and the enclosure. The outer container can have a fastener ring attached to it having a plurality of attachment points for the fasteners. The enclosure, and bottom plate assembly can be removably attached to the outer container through the fastener ring. The bottom enclosure can hold electronics, battery, USB port, and status LED. The electronics can include a Bluetooth module, a Microcontroller, input/output pins, and a printed circuit board. The electronics can be connected to a temperature and humidity probe, which can be removably connected to the bottom enclosure or the outer container. The bottom enclosure and bottom plate can further comprise a locking device wherein the locking device can removably connect to and lock the inner compartment down into the outer container.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

DETAILED DESCRIPTION

The embodiments of the invention described herein are not intended to be exhaustive or to limit the invention to precise forms disclosed. Rather, the embodiments selected for description have been chosen to enable one skilled in the art to practice the invention.

Figure 1:
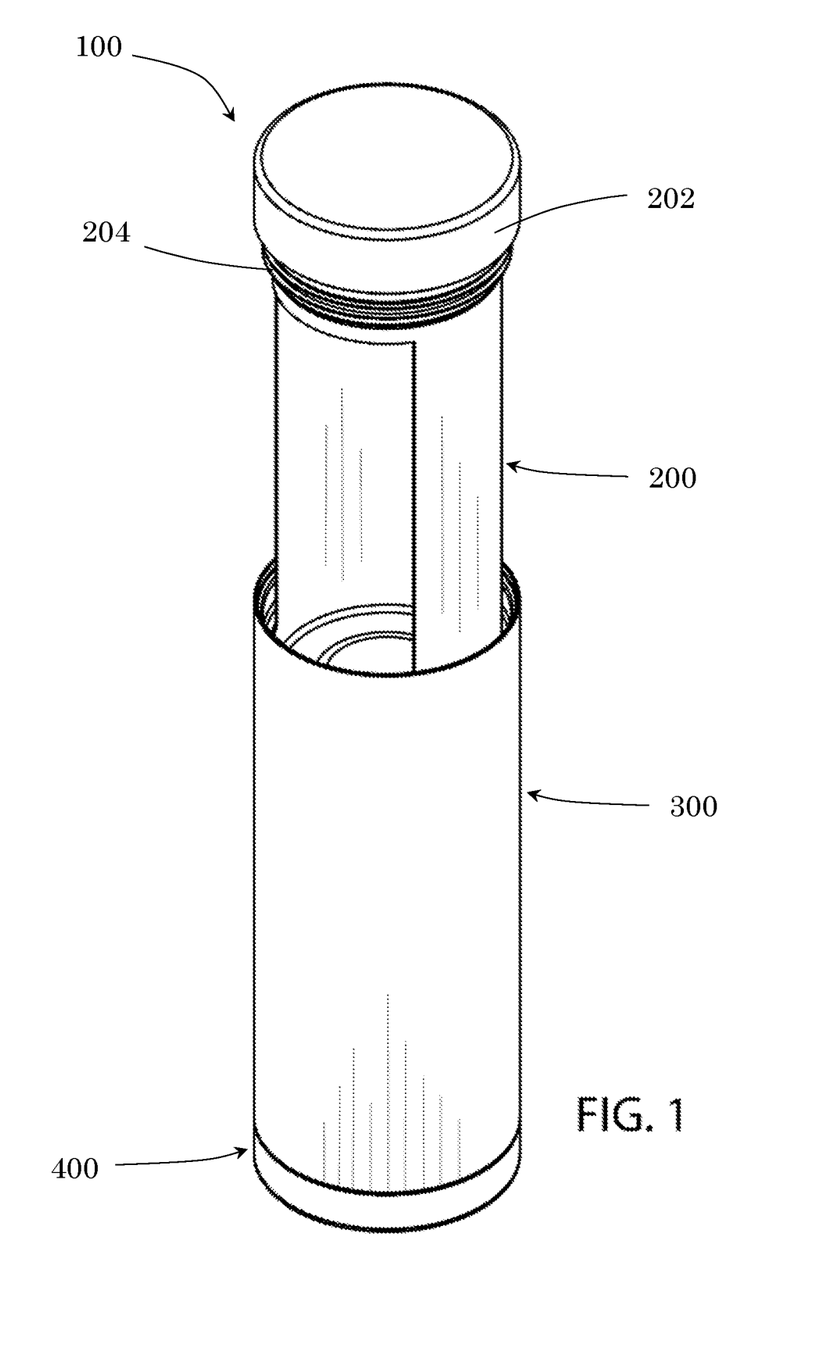
FIG. 1 shows an isometric view of an environmental storage container system in accordance to one, or more embodiments.
Figure 2:
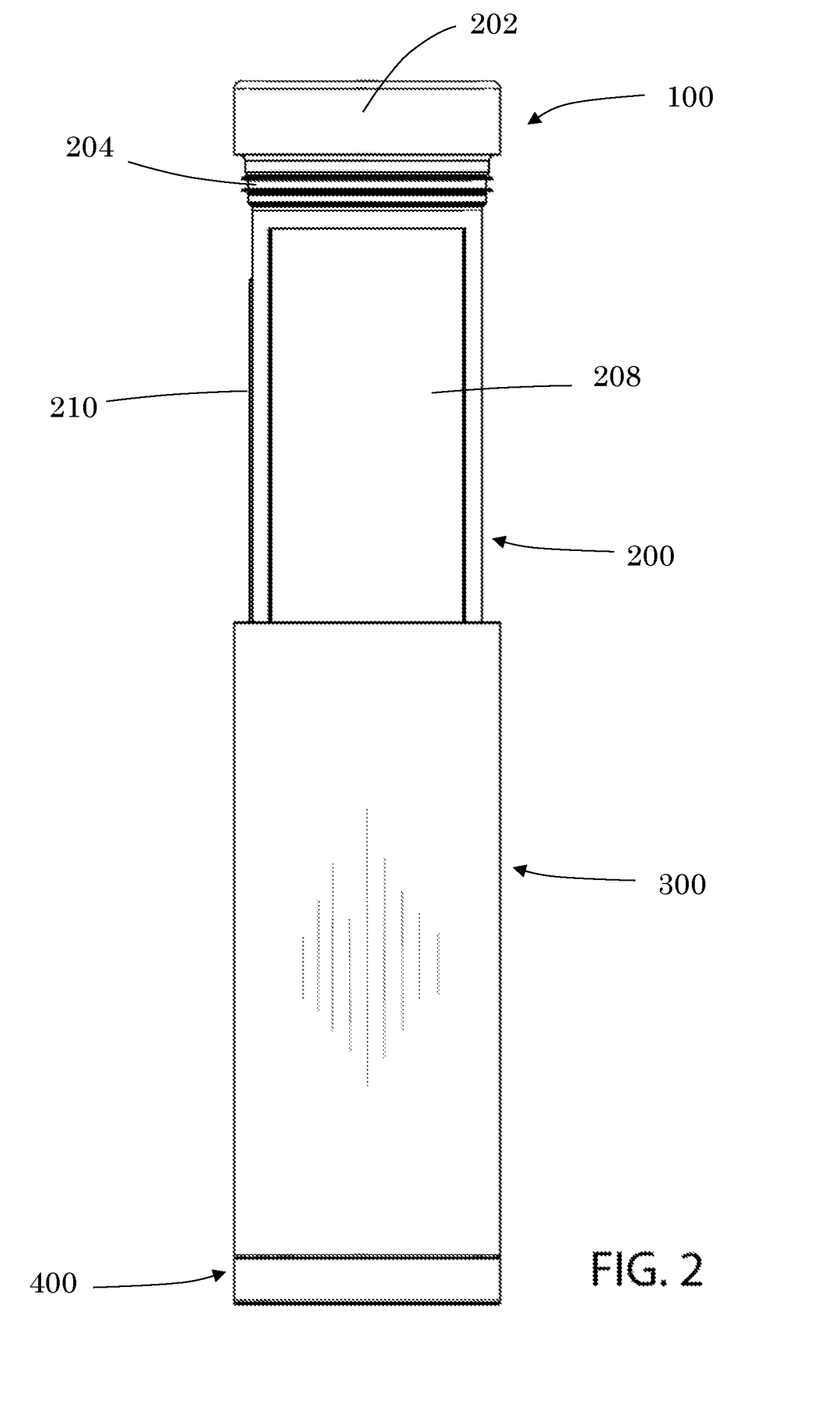
FIG. 2 shows a front view of an environmental storage container system in accordance to one, or more embodiments.
Figure 3:
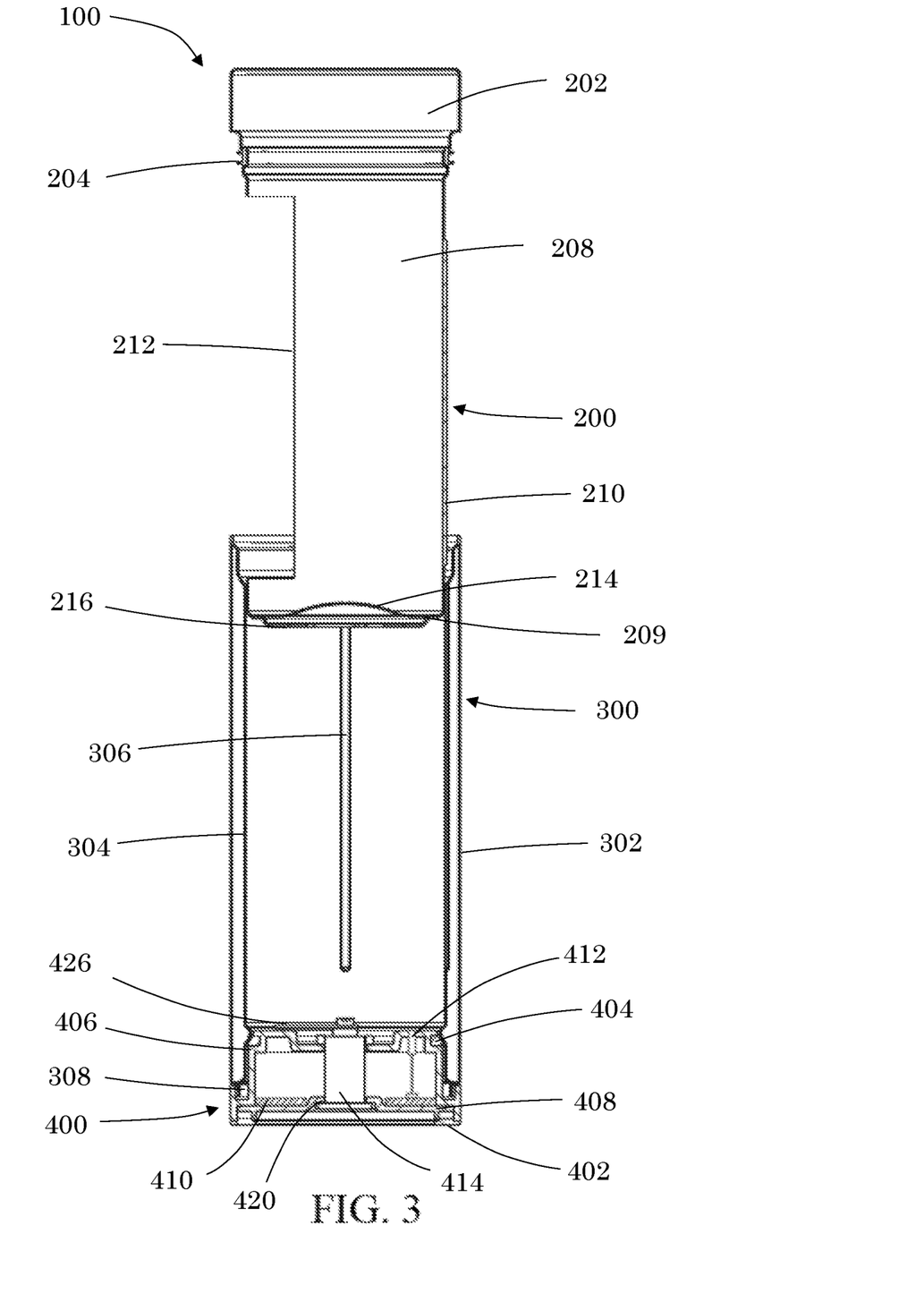
FIG. 3 shows a side section view of an environmental storage container system in accordance to one, or more embodiments.
Figure 4:
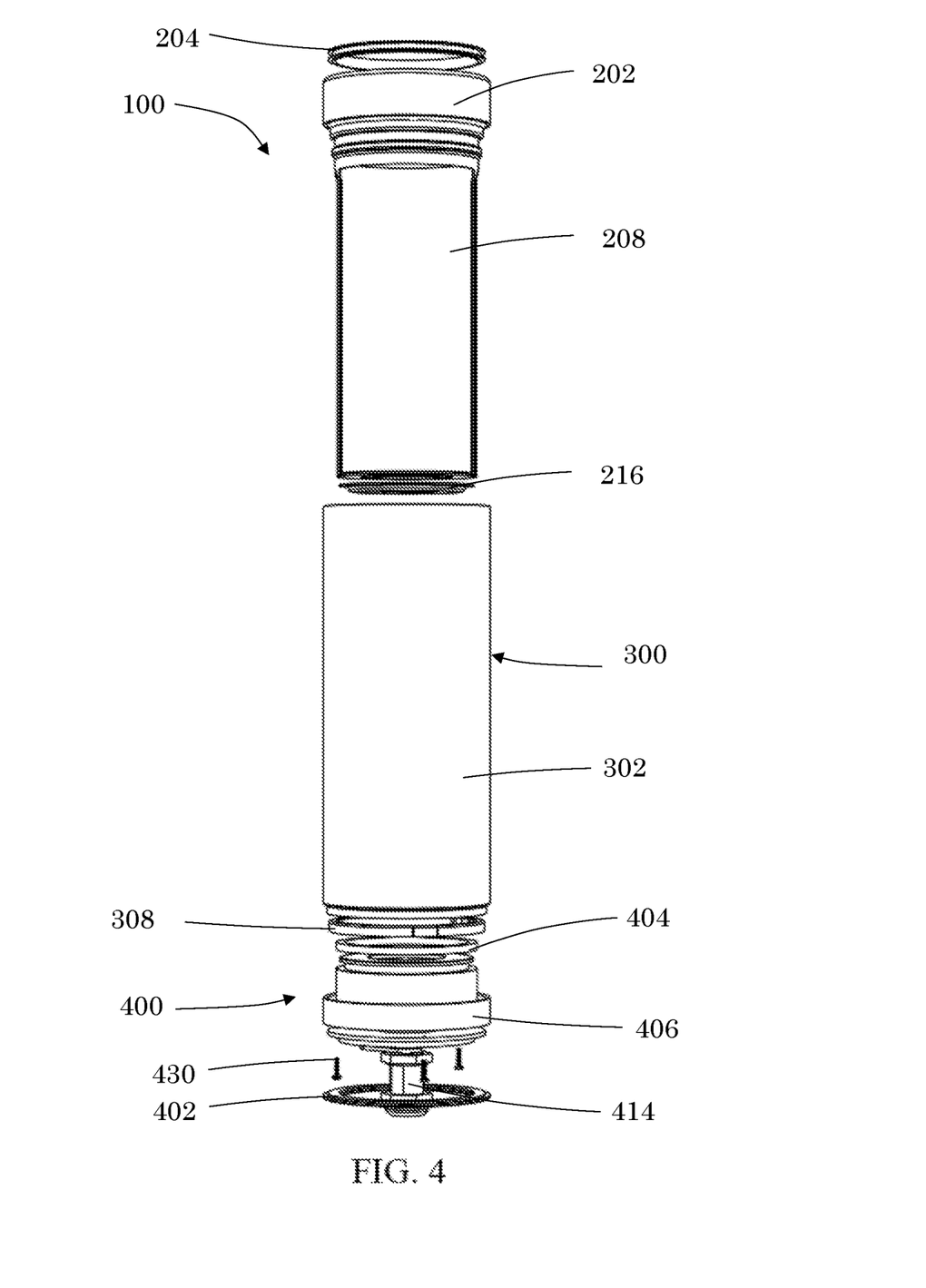
FIG. 4 shows an exploded front view of an environmental storage container system in accordance to one, or more embodiments.
Figure 5:
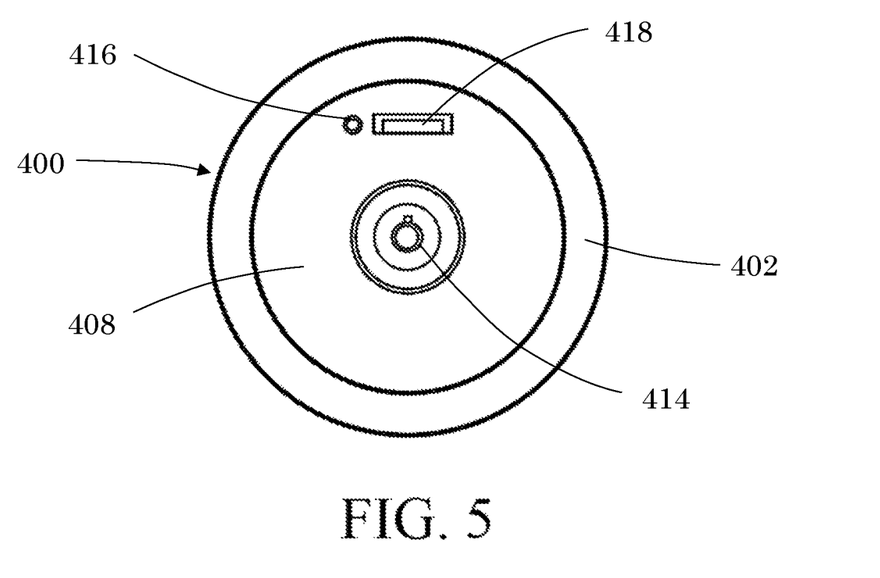
FIG. 5 shows a top view of an environmental storage container system in accordance to one, or more embodiments.

Referring initially to FIG. 1, an isometric view of a portable environmental storage container system shown generally at 100. In a preferred embodiment, a portable environmental storage container system can comprise a lid 202, an inner compartment 200, an outer container 300, and a bottom enclosure 400. An inner compartment 200 can slide in and out of an outer container 300 and seal shut with one or more seals 204.

Referring to FIG. 2 through FIG. 5, a front view and a cross sectional side section view of a portable environmental storage container system shown generally at 100. In embodiments, an inner compartment 200 can comprise a lid 202, and an inner compartment 208. The lid 202 can be circular having a large section and small section having a hollow center with both sections having an inner and outer diameter. The lid's 202 smaller section can have one or more grooves on its outer diameter that can house one or more seals 204. The lid 202 can be such as, for example, circular, square, rectangular, triangular, or the like. The lid 202 can be attached to an inner compartment 208 by such as, for example, a seam weld, a joint weld, a groove weld, a bevel weld, or the like. The lid 202 can be a single layer, dual layer, triple layer, or the like with an air gap between each layer acting as an insulating barrier. A lid 202 can be made from lightweight, generally rigid material, such as, for example, plastics including acrylic, acrylonitrile butadiene styrene ("ABS"), polypropylene, polyamide, polyethylene, or metals such as, for example, aluminum, stainless steel, or the like. The lid can be formed by standard manufacturing procedures such as stamping, forging, molding, or the like. In certain embodiments, the lid 202 can have a charcoal filter (not shown) lining its inner diameter or inner circumference.

Figure 6:
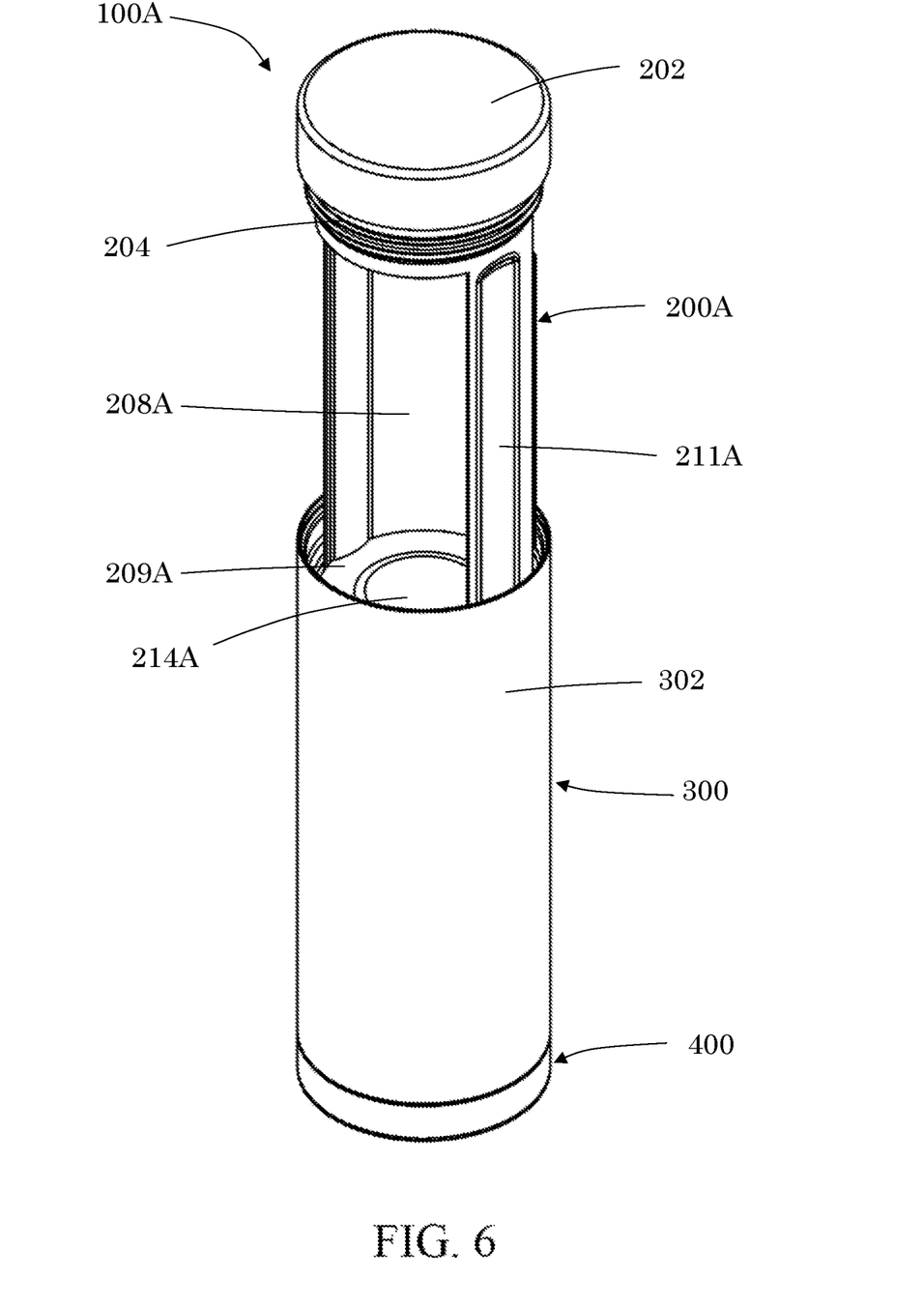
FIG. 6 shows an isometric view of additional embodiment of an environmental storage container system in accordance to one, or more embodiments.

In embodiments, an inner compartment 208 can slide or move in and out of an outer container 300. The inner compartment 208 can have one or more guides 210 that can extend vertically from about the inner compartment's bottom surface to about its top surface leaving about such as, for example, at least 0.010 inch, at least 0.020 inch, at least 0.030 inch, at least 0.040 inch, at least 0.050 inch, at least 0.060 inch, at least 0.070 inch, at least 0.10 inch, or the like of material, or at most 0.010 inch, at most 0.020 inch, at most 0.030 inch, at most 0.040 inch, at most 0.050 inch, at most 0.060 inch, at most 0.070 inch, at most 0.10 inch, or the like, or the guides can be integrally formed within the inner compartment or can be a rail 211A as shown in FIG. 6. An inner compartment 208 can be made from lightweight, generally rigid material, such as, for example, plastics including acrylic, acrylonitrile butadiene styrene ("ABS"), polypropylene, polyamide, polyethylene, or metals such as, for example, aluminum, stainless steel, Inconel, or the like. The inner compartment 208 wall thickness can be such as, for example, at least 0.005 inch, at least 0.01 inch, at least 0.05 inch, at least 0.07 inch, at least 0.1 inch, at least 0.125 inch, or the like. An inner compartment 208 wall thickness can be such as, for example, at most 0.005 inch, at most 0.01 inch, at most 0.05 inch, at most 0.07 inch, at most 0.1 inch, at most 0.125 inch, or the like. The inner compartment 208 can have a cutout 212 on its front side or its back side rotating around its axis leaving the front open to access the contents inside. The cutout 212 can allow the user to access, and safely store items within the inner compartment 208. In certain embodiments, an inner compartment 208 can be circular, square, rectangular, triangular, or the like in shape creating an inner circumference and outer circumference. In certain embodiments, the inner compartment 208 can have a refrigeration system such as ice bags, ice, cold packs, or electronic AC system that can keep the contents either warm or cold and at a set temperature. In certain embodiments, the inner compartment 208 can have a storage grate that can enclose and keep the ice, cold packs, or humidity packs safe and clear of the contents in the inner compartment. In another embodiment, a refrigeration system can be placed in the lid 202, or in the bottom enclosure 400.

In embodiments, a locking plate 216 can be attached to the inner compartment's base 209 by such as, for example, a seam weld, a joint weld, a groove weld, a bevel weld, or the like. The locking plate 216 can be circular, square, rectangular, hexagonal, or the like in shape. The locking plate 216 can have a hole through it that allows the lock arm 426 to pass through it and turn to a solid portion to allow the lock arm to press fit, loose fit, or the like the locking plate onto the lock arm keeping the inner compartment 200 locked into the outer container 300. The inner compartment 200 can have a base 209 with a concave bottom 214, or in certain embodiments the concave bottom can be omitted and the bottom can be flat or convex. The locking plate 426, and the bottom can be formed as separate pieces from the inner compartment 208 or it can be formed as one solid piece by such as mold, forging, stamping, machining, or the like.

In certain embodiments, a lid 202 can contain a humidifier by a lid containment ring (not shown). The humidifier can be a bead system, a bag system, or a humidifying system with a plug in the lid 202. In certain embodiments, a humidifier can be omitted from a lid 202. A containment ring can lock into a lid 202 with snaps, locking detents on it outer circumference, or the like. A containment ring (not shown) can have a plurality of holes on its surface allowing the humidity to escape the lid and enter an inner compartment 200. A humidifier can emit humidity at for example, at least 20%, at least 30%, at least 40%, at least 50%, at least 60%, at least 40%, at least 62%, at least 70%, or the like. A humidifier (not shown) can emit humidity at for example, at most 20%, at most 30%, at most 40%, at most 50%, at most 60%, at most 62%, at most 70%, or the like.

In embodiments, an outer container 300 can protect and enclose an inner compartment 200. The inner compartment 200 can slide in and out of an outer container 300 on one or more guide slots 306 and/or can have opposing rail to the inner compartment's rail 211A as shown in FIG. 6. The outer container 300 can be a tube having an outer wall 302, and inner wall 304 having an air gap between each wall that can be vacuumed or insulated having an open on its top end and on its bottom end. The outer wall 302 and the inner wall 304 can be connected at its top surface and bottom surface by such as, for example, a seam weld, a joint weld, a groove weld, a bevel weld, or the like. The inner wall 304 can increase in diameter near the top allowing the room for the seal 204, which can seal the inner container 300 inside the outer container 300. In inner wall 304 can decrease in size, and then increase in size near the bottom allowing for a fastener ring 308 to be mated, and attached to the inner wall by such as, a seam weld, a joint weld, a groove weld, a bevel weld, or the like. In certain embodiments, as an inner wall 304 can be connected to an outer wall 302 which the air can be expelled creating a vacuum and an insulated layer between the two walls. In another embodiment, between an inner wall 304, and an outer wall 302, a charcoal filter (not shown) can line or fill the gap of air insulation between inner wall and outer wall creating a charcoal filter protective barrier around the inner wall. The charcoal filter (not shown) can be for example, active charcoal filter, HEPA filter, carbon scrubbed filter, or the like. One or more guide slots 306 can be formed, attached to, forged, or molded into the inner wall 304. The outer container 300 can be made from lightweight, generally rigid material for example, plastics including acrylic, acrylonitrile butadiene styrene ("ABS"), polypropylene, polyamide, polyethylene, or in an exemplary embodiment metals such as, for example, aluminum, stainless steel, Inconel, or the like.

A fastener ring 308 can be placed into and attached to the inner wall 304 of the outer container 300. The fastener ring 308 can be made from lightweight, generally rigid material, such as, for example, plastics including acrylic, acrylonitrile butadiene styrene ("ABS"), polypropylene, polyamide, polyethylene, or metals such as, for example, aluminum, stainless steel, or the like. A fastener ring 308 can have a plurality of attachment points for a plurality of fasteners 430.

In embodiments, a bottom enclosure 400 can comprise an enclosure 406, a bottom plate 408, a fastener enclosure 402, a lock 414, a pcb 410, a sensor 412 and a bottom seal 404. The enclosure 406 can be generally round, but in certain embodiments it can be square, rectangular, hexagonal, or the like. The enclosure 406 can have an inner wall and an outer wall creating a hollow protective barrier for the pcb 410, and a slot around the outer wall near the top of the bottom enclosure. The enclosure 406 can have a flat portion near the bottom wherein the flat portion can have a plurality of holes for fasteners 430 to be inserting through, and an anti-rotation pin (not shown) can be placed along the outer wall, and can match with a slot in the fastener ring 308 keeping the bottom enclosure from rotating when in position. The bottom enclosure 406 can have two or more holes on its top surface, where one hole is centered having flats on two of its surfaces, for the lock to be removably attached to, and for the sensor 412 to be inserted and attached to. The bottom enclosure 406 can be made from lightweight, generally rigid material for example, plastics including acrylic, acrylonitrile butadiene styrene ("ABS"), polypropylene, polyamide, polyethylene, carbon fiber, or metals such as, for example, aluminum, stainless steel, or the like.

The bottom plate 408 can have a hole 420 in the center which allow the lock 414 to sit flush against the bottom plate. A bottom plate 408 can have a ridge generally near the outer diameter of the plate projecting outwards from the bottom of the bottom plate. A ridge can be circular, square, rectangular, or the like in shape. The bottom plate 408 can have two or more holes for a USB port 418, and a LED indicator 416, and in some embodiments the USB port can be a micro port, or dc barrel jack, and can be located on the outer circumference of the bottom enclosure 400, or located on the outer container 300. The bottom plate 408 can be inserted into and removably attached to the enclosure 406. The bottom plate 408 can be made from lightweight, generally rigid material for example, plastics including acrylic, acrylonitrile butadiene styrene ("ABS"), polypropylene, polyamide, polyethylene, carbon fiber, or metals such as, for example, aluminum, stainless steel, or the like.

In embodiments, the pcb 410 can be attached to the bottom plate 408. The pcb 410 can comprise a Bluetooth module, a Microcontroller, input/output pins, a printed circuit board, charging port, and status light or speaker, or the like. The pcb 410 can be connected to a sensor 412 which can be removably connected to the enclosure 406. The sensor 412 can be any one or combination of temperature, humidity, pressure, flow, proximity, smoke or gas, IR, or the like. The sensor 412 can be sealed onto the enclosure 406 by for example, epoxy, circular tubing, or the like, keeping the inside of the container sealed when closed, and airtight. The Bluetooth or Wi-Fi module can send and receive information packets to a smartphone from the pcb 410 giving the user the environmental conditions inside the outer container 300. The smartphone can give the user alerts if the conditions inside the outer condition go out of the normal operating range set by the user, and can track and log data.

In embodiments, the bottom seal 404 can be placed around and in the slot of the outer wall of the enclosure 406. The bottom seal 404 can be made from lightweight, generally flexible material for example, silicone, rubber, buna, wax, viton, or the like. The bottom seal 404 can keep the inside of the outer container 300 air tight and insulated. In certain embodiments, the air can be evacuated from the inside of the outer container 404, and inner compartment 200, by either forcing the air out with a vacuum, or filling the container with gas such as nitrogen, helium, or oxygen through a port (not shown) on the lid 202, outer container 300, or the bottom enclosure 400.

In embodiments, the lock 414 can be placed into and locked into position through the bottom plate's 408 hole, and the bottom enclosure's 406 hole. The bottom plate 408 can have a plurality of fastener holes near its outer circumference wherein the bottom plate can be removably attached to the enclosure 406 by fasteners to the fastener ring 308. The bottom plate 408, pcb 410, enclosure 406, and lock 414 can be removably attached to the fastener ring 308 and outer container 300. The fastener enclosure 402 can be removably attached to bottom plate 408 and the enclosure 406 covering the plurality of fasteners 430. The fastener enclosure 408 can be substantially circular with an inner and outer diameter having a top piece protruding from its top. In other embodiments, the fastener enclosure 402 can be square, rectangular, hexagonal or the like, and match the shape of the enclosure 406, and outer container 300. The fastener enclosure 402 can be attached by, for example, glue, bolts, epoxy, press fit, snap rings, or the like. The fastener enclosure 402 can be from lightweight, generally rigid material, such as, for example, plastics including acrylic, acrylonitrile butadiene styrene ("ABS"), polypropylene, polyamide, polyethylene, or metals such as, for example, aluminum, stainless steel, or the like.

The lock 414 can be for example circular, square, triangular or the like in shape. The lock 414 can lock the inner compartment 200 into an outer container 300. The lock 414 can have an O-ring placed on its outer surface keeping a seal between the enclosure 406, and outer container. A lock 414 can be for example, mechanical lock, digital lock, dial lock, cam lock, biometric lock, push button lock, or the like. A battery (not shown) can power both the biometric lock, and the electronics.

Figure 7:
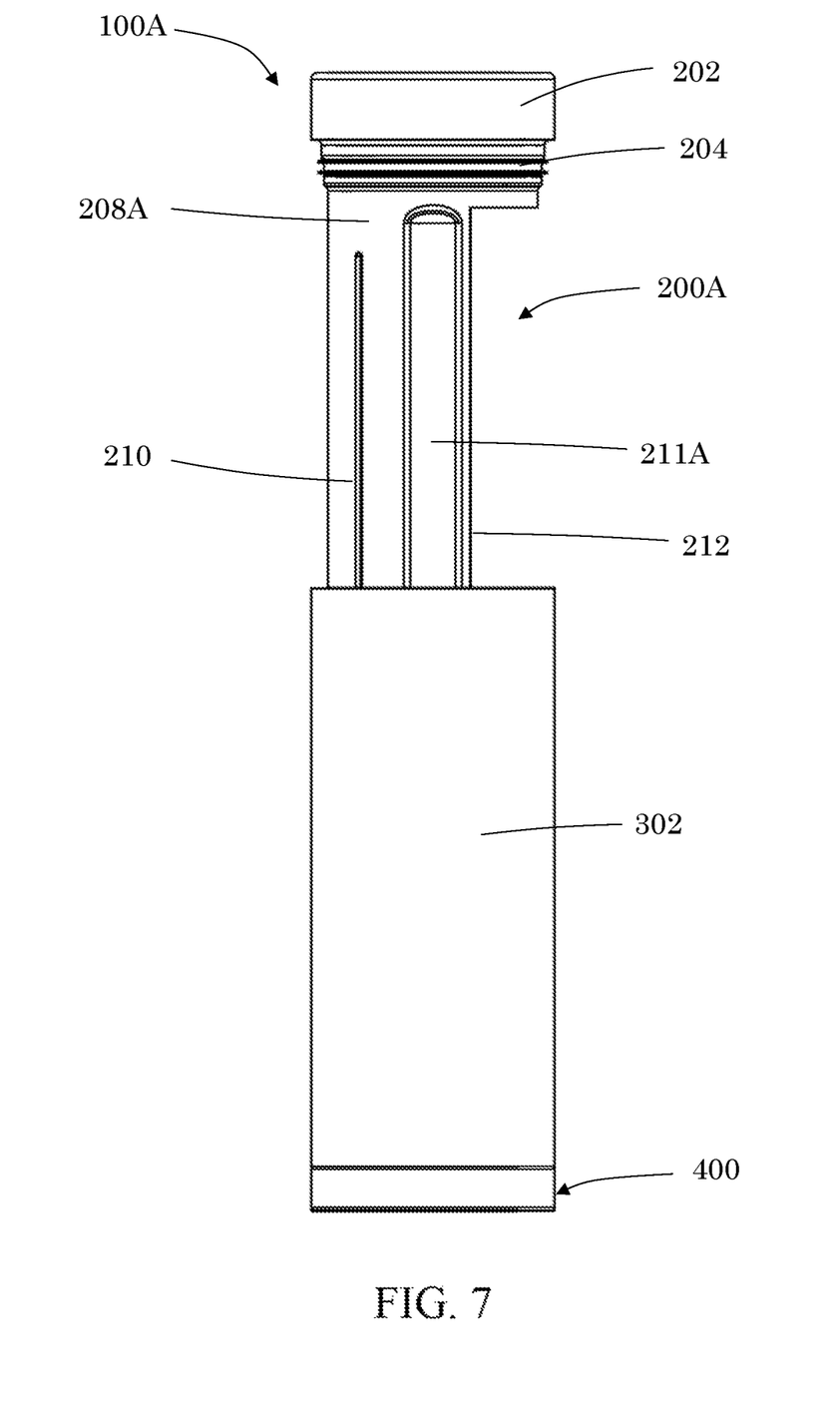
FIG. 7 shows a side view of an additional embodiment of an inner compartment environmental storage container system in accordance to one, or more embodiments.
Figure 8:
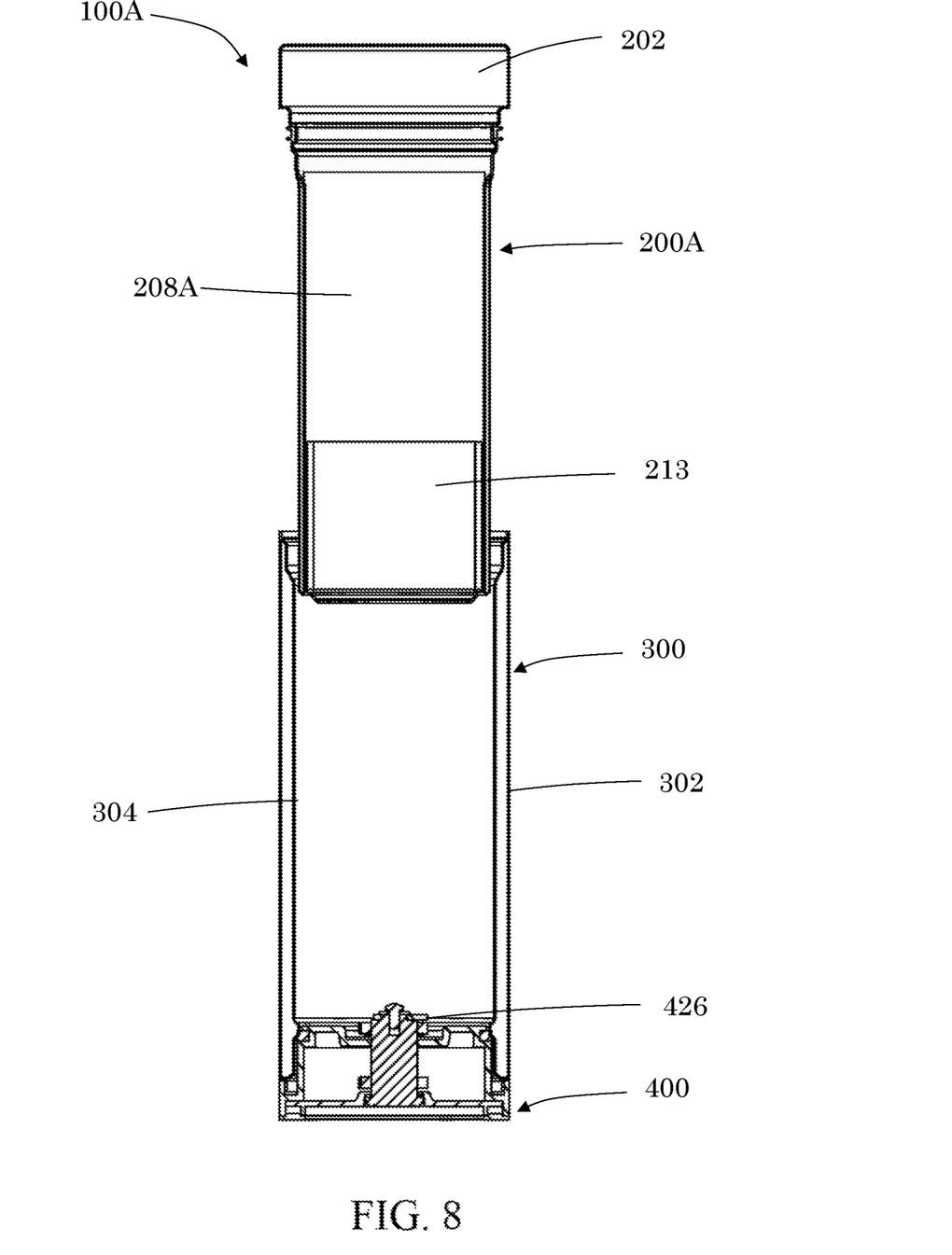
FIG. 8 shows a side cross-sectional view of an additional embodiment of an inner compartment environmental storage container system in accordance to one, or more embodiments.

Referring to FIG. 6 through 8 an isometric, a side view and cross sectional view of an additional embodiment of a portable environmental storage container system shown in its open position at 100A. In an additional embodiment, a portable environmental storage container system can comprise a lid 202, an inner compartment 200A, an outer container 300, and a bottom enclosure 400. An inner compartment 200a can slide in and out of an outer container 300 and seal shut with one or more seals 204. An inner compartment 200A can comprise of a lid 202, an inner compartment 208A, a base 209A, and a locking plate 216. The inner compartment 208A can have a wall with an inner and outer circumference extending from the lid 202 to the base 209A. The inner compartment 208A can be attached to the lid 202 and the base 209A by such as, for example, a seam weld, a joint weld, a groove weld, a bevel weld, or the like.

The inner compartment 208A can have one or more guides 210 that can extend vertically from about the inner compartment's bottom surface to about its top surface leaving about such as, for example, at least 0.010 inch, at least 0.020 inch, at least 0.030 inch, at least 0.040 inch, at least 0.050 inch, at least 0.060 inch, at least 0.125 inch, at least 0.250 inch, or the like of material left on the top and bottom, or at most 0.010 inch, at most 0.020 inch, at most 0.030 inch, at most 0.040 inch, at most 0.050 inch, at most 0.060 inch, at most 0.125 inch, at most 0.250 inch, or the like. An inner compartment 208A can be made from lightweight, generally rigid material, such as, for example, plastics including acrylic, acrylonitrile butadiene styrene ("ABS"), polypropylene, polyamide, polyethylene, or metals such as, for example, aluminum, stainless steel, or the like. The inner compartment 208A wall thickness can be such as, for example, at least 0.005 inch, at least 0.01 inch, at least 0.05 inch, at least 0.07 inch, at least 0.1 inch, at least 0.125 inch, or the like. An inner compartment 208A wall thickness can be such as, for example, at most 0.005 inch, at most 0.01 inch, at most 0.05 inch, at most 0.07 inch, at most 0.1 inch, at most 0.125 inch, or the like. The inner compartment 208A can have a cutout 212 on its front side or its back side rotating around its axis leaving the front open to access the contents inside. The cutout 212 can allow the user to access, and safely items within the inner compartment 208A. In certain embodiments, an inner compartment 208A can be circular, square, rectangular, triangular, or the like in shape creating an inner circumference and outer circumference. The inner compartment 208A walls can have two or more rails 211A wherein the rails are located opposite of each other extending from about the bottom of the inner compartment walls, to about the top of the inner compartment walls. The rails 211A can be a part of the walls such as stamped, embossed or the like, or the rails can be added to the walls by such as, a seam weld, a joint weld, a groove weld, a bevel weld, or the like. The rails can extend either vertically, or the rails can be in a horizontal position holding an accessory in place both horizontally, and vertically.

In embodiments, the base 209A can be attached to the inner compartment 208A walls, or it can be formed as one piece with the inner compartment walls. The base 209A can be circular, rectangular, square, or the like. The base 209A can have a bottom 214A having either a concave, convex, or flat surface, which can have substantially the same thickness of the walls or can have substantially thinner or thicker wall thickness then the walls. In certain embodiments, a bottom can have one or more holes to allow the sensor 412 to read the temperature, humidity or other readings with the inner compartment 208A. The locking plate 216 can be attached to the base 209A by such as, for example, a seam weld, a joint weld, a groove weld, a bevel weld, or the like. The locking plate 216 can be circular, square, rectangular, hexagonal, or the like in shape. The base 209A can have a concave bottom 214A, or in certain embodiments the concave bottom can be omitted and the base can be flat. The locking plate 214 can have a hole for a locking arm 426 to enter and to lock the inner compartment 200A into the outer container 300.

The inner compartment 208A, and two or more rails 211A can have an accessory 213 removably inserted into the inner compartments, and can lock onto the rails. The accessory 213 can have grooves that match the rails 211A such that the accessory can lock into place. An accessory 213 can be substantially circular, or in other embodiments can be square, rectangular, hexagonal, or the like in shape with an indent to match the rails. In other embodiments, the indent can be omitted from the accessory 213, and it can be circular, square, rectangular, hexagonal, or the like in shape.

Figure 9:
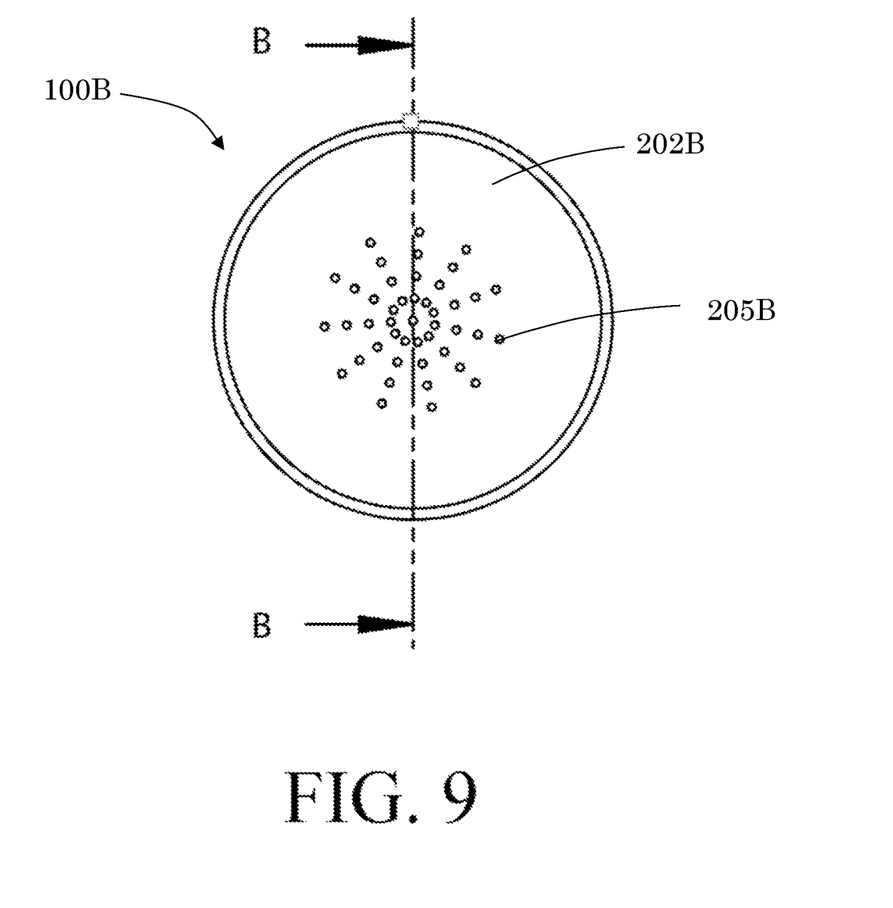
FIG. 9 shows a top view of another embodiment of an inner compartment environmental storage container system in accordance to one, or more embodiments.
Figure 10:
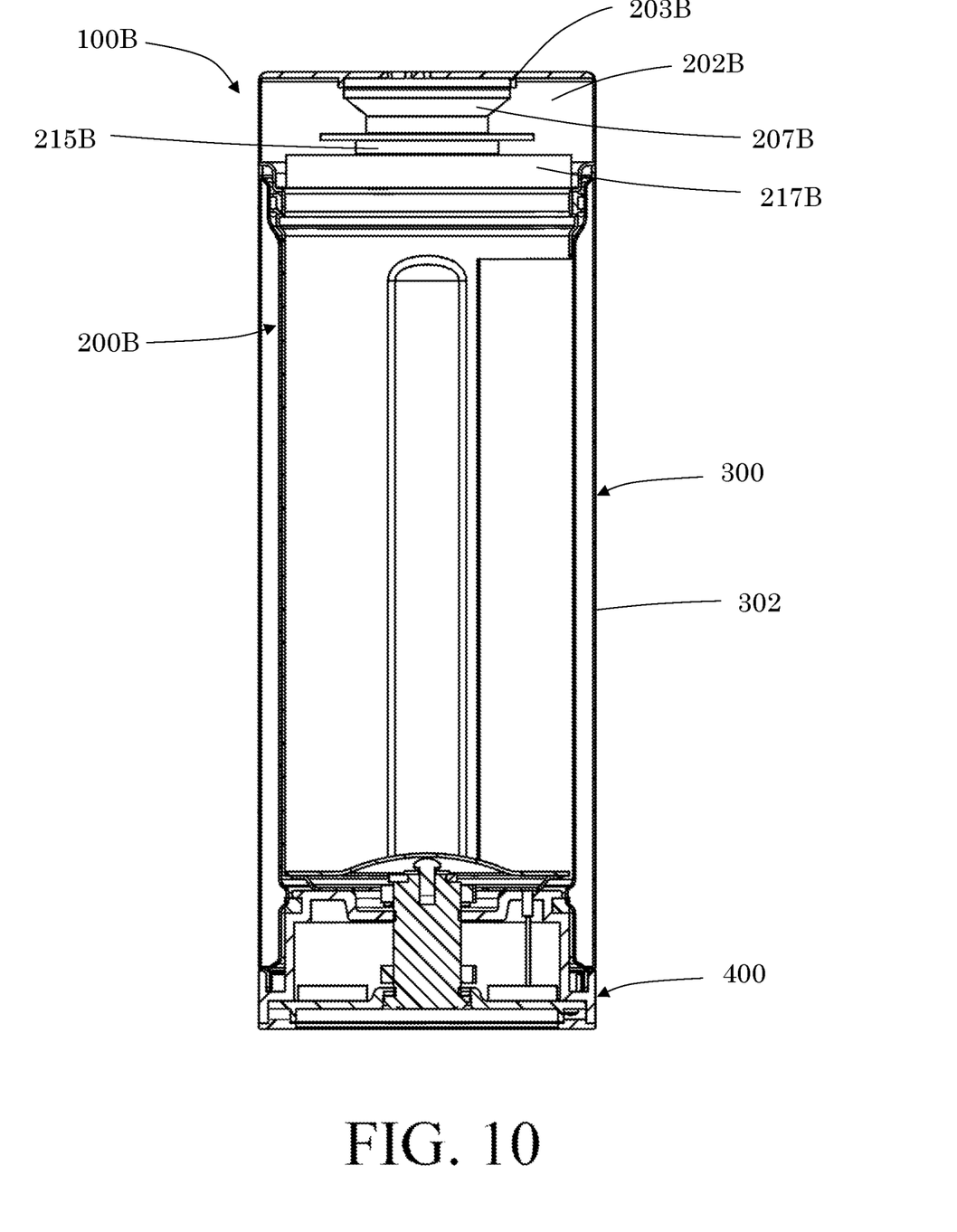
FIG. 10 shows a side cross-sectional view of another embodiment of an inner compartment environmental storage container system in accordance to one, or more embodiments.

Referring to FIG. 9 through 10 a top view and sectional side view of an additional embodiment of a portable environmental storage container system shown in its closed position at 100B. In an additional embodiment, a portable environmental storage container system can comprise an inner compartment 200A, an outer container 300, and a bottom enclosure 400. An inner compartment 200B can comprise of a lid 202B, an inner compartment 208, a base 209, and a locking plate 216. The lid 202B can contain the speaker 207B, an amplifier 215B, and a Bluetooth emitter/receiver. A lid 202B can be circular having a large section and small section having a hollow center with both sections having an inner and outer diameter. The lid's 202B smaller section can have one or more grooves on its outer diameter that can house one or more seals 204. The lid 202B can be such as, for example, circular, square, rectangular, triangular, or the like. The lid 202B can be attached to an inner compartment 208 by such as, for example, a seam weld, a joint weld, a groove weld, a bevel weld, or the like. The lid 202B can be a single layer, dual layer, triple layer, or the like with an air gap between each layer acting as an insulating barrier. A lid 202B can be made from lightweight, generally rigid material, such as, for example, plastics including acrylic, acrylonitrile butadiene styrene ("ABS"), polypropylene, polyamide, polyethylene, or metals such as, for example, aluminum, stainless steel, or the like. In certain embodiments, the lid 202 can have a charcoal filter (not shown) lining its inner diameter or inner circumference. The lid 202B can have a plurality of holes 205B on its top surface wherein the holes can create a variety of rectangular or circular shapes. The holes 205B can allow air, and vibration to pass through for a speaker's 207B sounds waves to pass through. The lid 202B can have a speaker mount 203B wherein the speaker mount can attach a speaker 207B by glue, fasteners, or the like to the lid.

Figure 11:
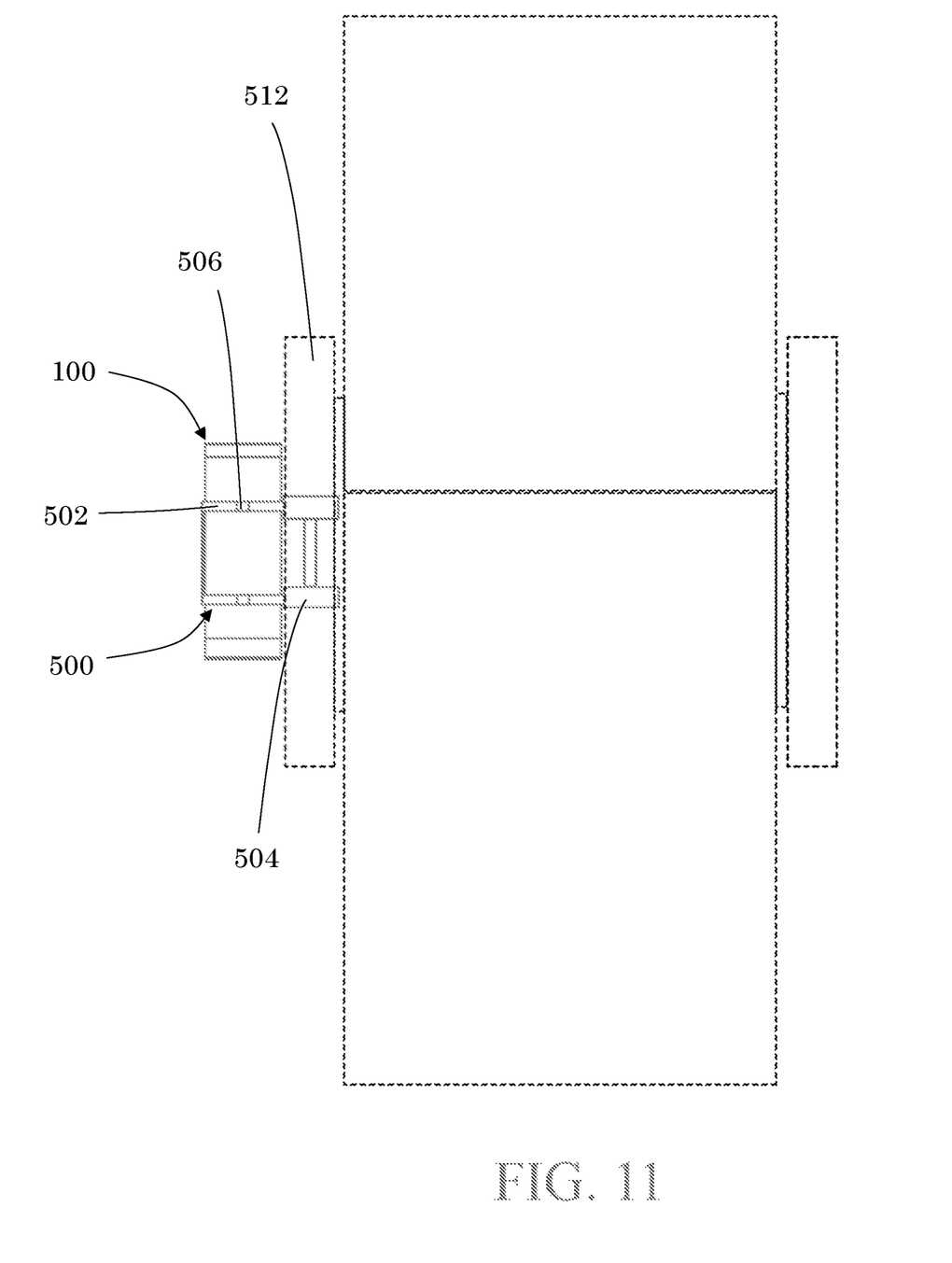
FIG. 11 shows a top view of an additional embodiment of an inner compartment environmental storage container system in accordance to one, or more embodiments.

Referring to FIG. 11 a top view an additional embodiment of a portable environmental storage container system shown in its closed position, and attached to a chair attachment 500. In embodiments, a portable environmental storage container system 100 can be attached to a chair attachment 500 that can comprise of a lock 506, a clamp 502, and a chair attachment 504. The clamp 504 can encapsulate or partial surround one or more attachment points the portable environmental storage container system 100. The clamp 502 can be hose clamp, retaining ring, band clamps, pipe clamp, locking clamp, keyed lock, t-bolt clamp or the like. The clamp 502 can retain and hold onto the outer circumference of the portable environmental storage container system 100. The clamp 502 can be attached to a chair attachment 504 by fasteners, welds, epoxy, press fit, snap rings, bolt and pin, or the like. The chair attachment 504 can be adjustable, and can fit and lock onto any chairs arm rest 512, including a beach chair, sun bathing chair, pool chair, camping chair, or the like. The chair attachment 504 can be locked by a padlock, cam lock, dial lock, or the like. The chair attachment 504 can fully or partially encapsulate the chair's arm rest 512 and can be removably attached or secured into position.

Figure 12:
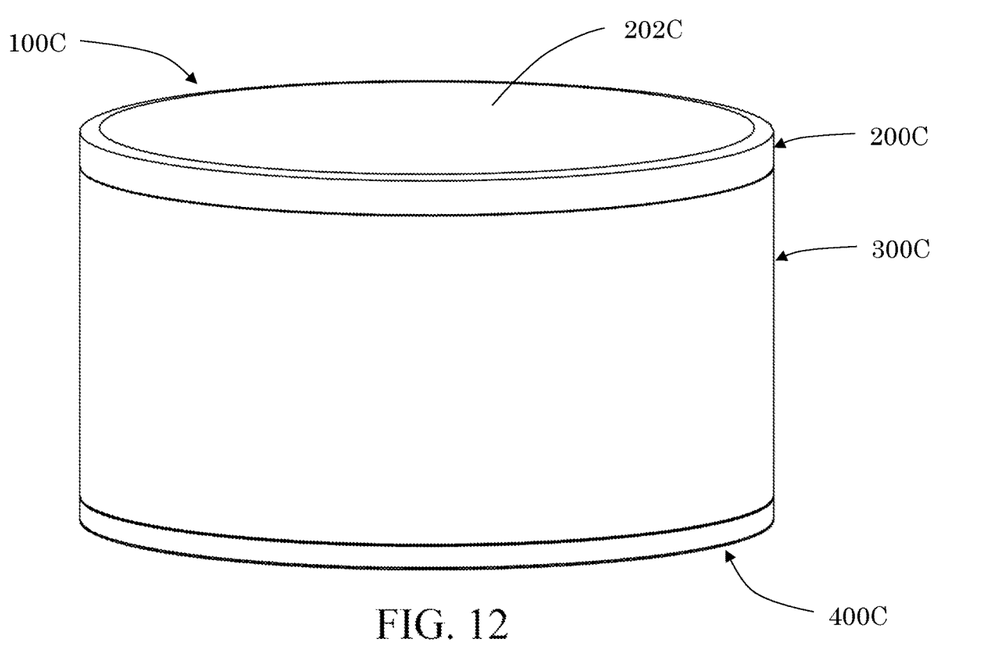
FIG. 12 shows an isometric view of an additional embodiment of an inner compartment environmental storage container system in accordance to one, or more embodiments.

Referring to FIG. 12 an isometric view an additional embodiment of a portable environmental storage container system 100C shown in its closed position. An environmental storage container system 100C can be in various sizes such as the outer diameter can be at least 2 inches, at least 3 inches, at least 4 inches, at least 5 inches, at least 6 inches, at least 12 inches, at least 18 inches, at least 24 inches, at least 36 inches, or the like. An environmental storage container system 100C can be in various sizes such as the outer diameter can be at most 2 inches, at most 3 inches, at most 4 inches, at most 5 inches, at most 6 inches, at most 12 inches, at most 18 inches, at most 24 inches, at most 36 inches, or the like. An environmental storage container system 100C can be in various heights such as at least 8 inches, at least 10 inches, at least 12 inches, at least 14 inches, at least 16 inches, at least 18 inches, at least 20 inches, at least 24 inches, or the like. An environmental storage container system 100C can be in various heights such as at most 8 inches, at least 10 inches, at most 12 inches, at most 14 inches, at most 16 inches, at most 18 inches, at most 20 inches, at most 24 inches, or the like. The internal pieces such as the inner compartment 200C, outer container 300 C, and the bottom enclosure 400C can be adjusted to match the environmental storage container system 100C size, and function such as a larger environmental storage container system 100C may be used to transport human organs from hospital to hospital while being able to take and store real time environmental data such as temperature and humidity, or flow, whereas a smaller environmental storage container system can be used to store, or transport cigars, snacks, drinks, medicinal *cannabis*, or the like. In certain embodiments, the inner compartment 200C can eliminate the inner compartment 208, and the lid 202C can seal the environmental storage container system closed.

Figure 13:
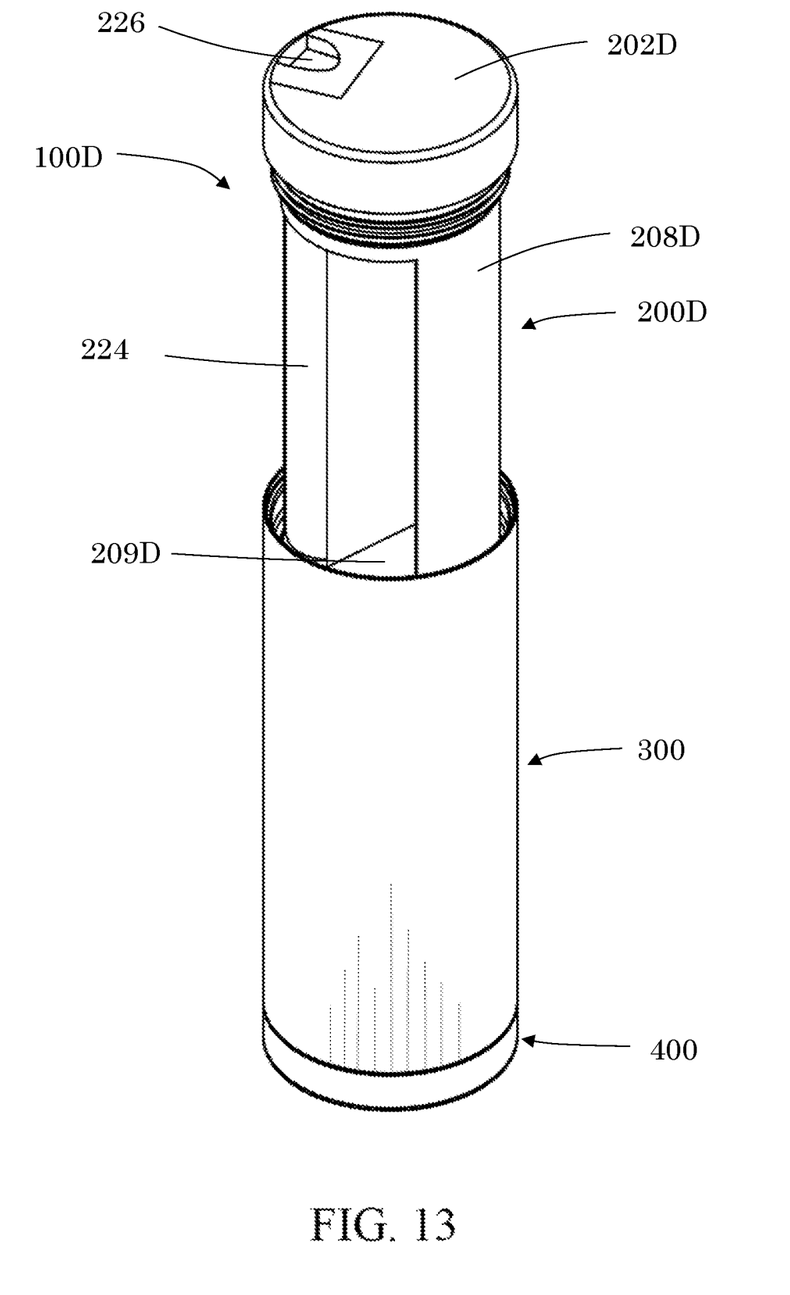
FIG. 13 shows an isometric view of yet another embodiment of an inner compartment environmental storage container system in accordance to one, or more embodiments.

Referring to FIG. 13 an isometric view an additional embodiment of a portable environmental storage container system 100D shown in its open position. In another embodiment, a portable environmental storage container system can comprise an inner compartment 200D, an outer container 300, and a bottom enclosure 400. The inner compartment can comprise a lid 202D, inner compartment 208D, and a bottom 209D. The inner compartment 208D can have one or more walls extending vertically from the lid 202D to the bottom 209D. The walls can have an inner circumference and an outer circumference wherein substantially half of the inner compartment is sealed or enclosed so that a liquid can be stored within the inner compartment, and the other half inner compartment can be left open to store items. The inner compartment 208D can be attached to the lid 202D by such as, for example, a seam weld, a joint weld, a groove weld, a bevel weld, or the like. The lid 202D can have a liquid opening 226 that can be flipped open and can be sealed shut when not in use allowing the user access to the inner liquid storage container, or can have an opening that a plug can be put into.

EXAMPLES

The following non-limiting examples are provided for illustrative purposes only in order to facilitate a more complete understanding of representative embodiments. These examples should not be construed to limit any of the embodiments described in the present specification including those pertaining to a putting training device, and a method of correcting putting.

Example 1

Portable Environmental Storage Container

A diabetic individual wants to transport their insulin on for an overnight trip. The individual can store and monitor their insulin in the portable environmental storage container. The individual can check their smartphone to ensure that their insulin is kept at the temperature and humidity level specified by the manufacturer. The individual can take their insulin on an overnight trip without the worry of it going bad, or degrading. In addition, the individual can use the portable environmental storage container to safely store and monitor cigars, medical *cannabis*, pills, nuts, chips, drinks, wallets, keys, or in the larger version safely transport and monitor human organs from hospital to hospital.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present disclosure, which is defined solely by the claims. Accordingly, embodiments of the present disclosure are not limited to those precisely as shown and described.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the disclosure are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the disclosed embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present disclosure and does not pose a limitation on the scope of the embodiments otherwise claimed. No language in the present specification should be construed as indicating any non-claimed element essential to the practice of the disclosed embodiments.

What is claimed is:

1. A portable environmental storage system comprising:
    an outer container;
    an inner compartment wherein the inner compartment comprises a locking plate and a lid wherein the inner compartment slides into the outer container;
    a bottom enclosure comprising a bottom plate and a bottom seal wherein the bottom enclosure attaches to the outer container creating a seal between the outer container and the bottom enclosure wherein the bottom plate comprises a locking device wherein the inner compartment is locked into the outer compartment by the locking device.

2. The portable environmental storage system of claim 1, wherein the inner compartment further comprises a base, and a seal wherein the locking plate is attached to the inner compartment's base and the seal can seal the inner compartment inside the outer container air tight.

3. The portable environmental storage system of claim 2, wherein the locking device is a cam lock, and/or biometric lock.

4. The portable environmental storage system of claim 1, wherein the system can further comprise computing system wherein the computing system can be attached inside the enclosure.

5. The portable environmental storage system of claim 4, wherein the computing system can comprise a Bluetooth module, a microcontroller, and one or more sensors wherein the sensors are temperature, accelerometer, and humidity probes.

6. The portable environmental storage system of claim 5, wherein the computing system can remotely communicate with a computing device wherein the computing device can display the sensors' and systems status.

7. The portable environmental storage system of claim 5, wherein the sensor can be removably attached to the outer container and/or inner compartment.

8. The portable environmental storage system of claim 1, wherein the inner compartment lid contains a portable speaker system wherein the lid has a charging port for the speaker system.

9. The portable environmental storage system of claim 4, wherein the enclosure further comprises a charging port, and a LED status light and/or screen.

10. The portable environmental storage system of claim 5, wherein the computing device can further comprise a global positioning device wherein the global positioning device transmits to a computing device the location of the system.

11. The portable environmental storage system of claim 1, wherein the portable environmental storage system is removably attached to a chair through a chair attachment.

12. The portable environmental storage system of claim 1, wherein the bottom enclosure is attached to a fastener ring by a plurality of fasteners wherein the fastener ring is attached to the outer container.

* * * * *